July 2, 1935.  L. A. GEBHARD ET AL  2,006,351
TEMPERATURE CONTROL SYSTEM
Filed Feb. 20, 1932
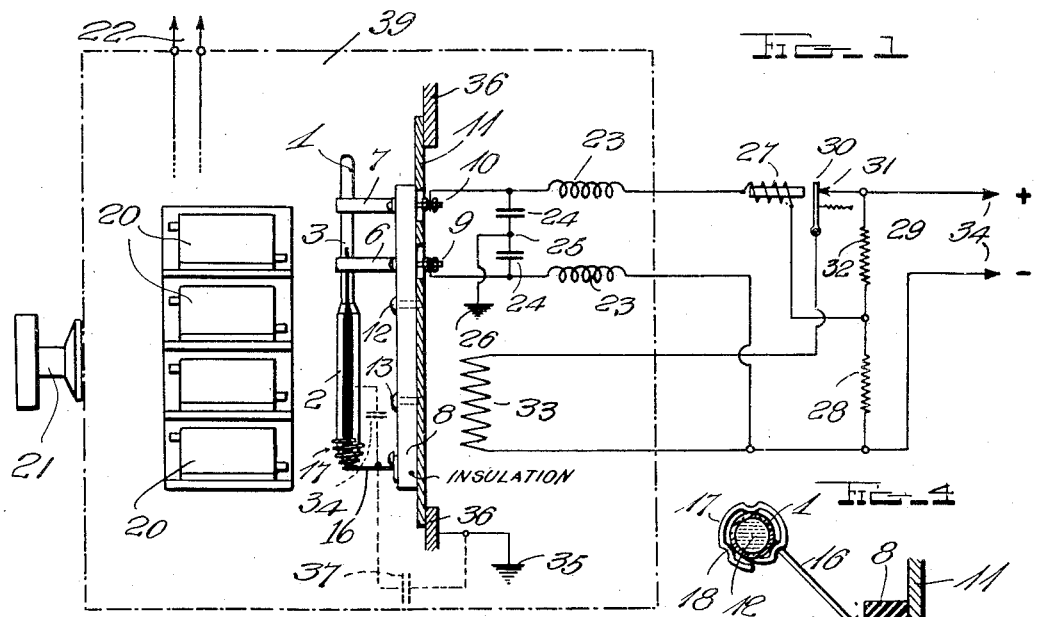
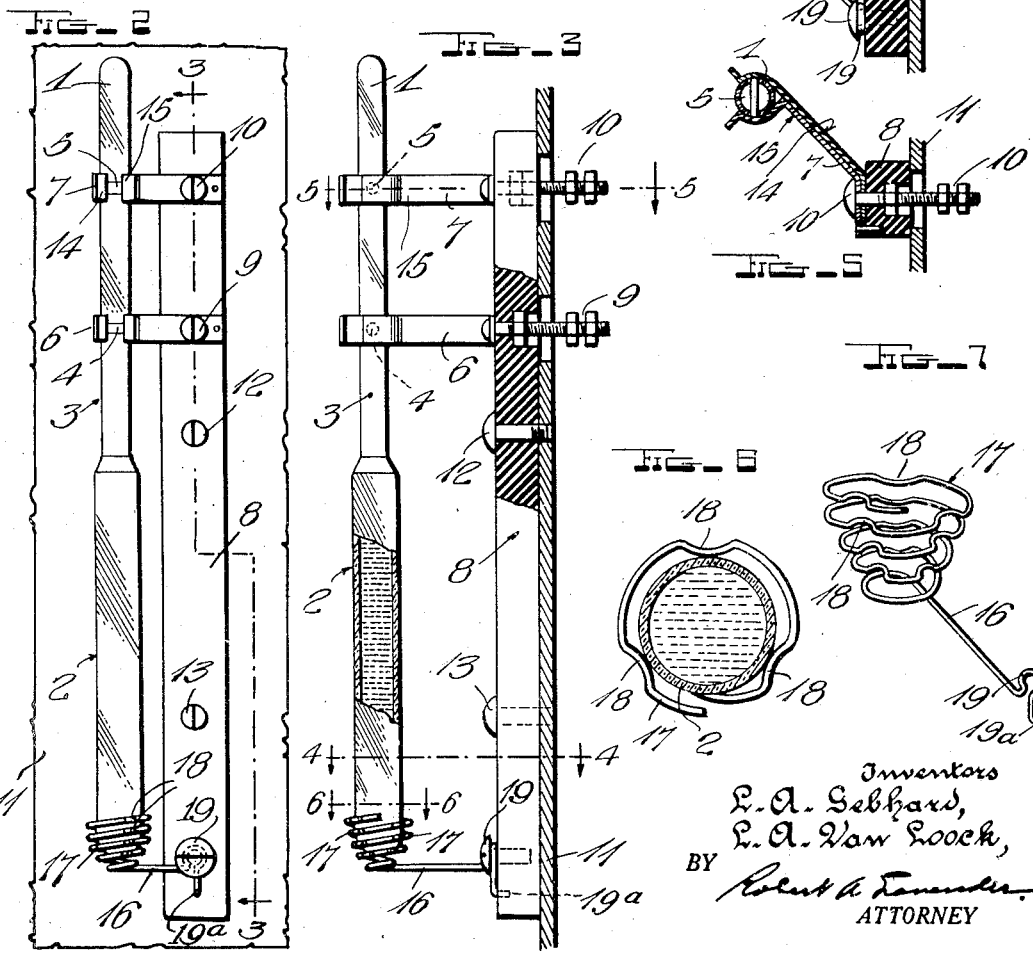
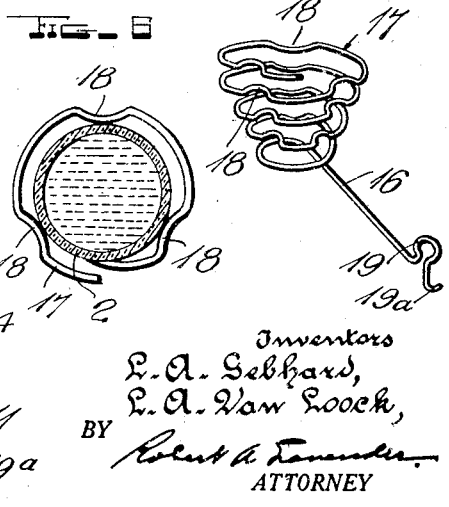
Inventors
L. A. Gebhard,
L. A. Van Loock,
BY
ATTORNEY Patented July 2, 1935

2,006,351

UNITED STATES PATENT OFFICE 2,006,351

TEMPERATURE CONTROL SYSTEM

Louis A. Gebhard and Louis A. Van Loock, Washington, D. C.

Application February 20, 1932, Serial No. 594,266

3 Claims. (Cl. 200—141)

(Granted under the act of March 3, 1883, as amended April 30, 1928; 370 O. G. 757)

Our invention relates broadly to temperature control systems and more particularly to a circuit arrangement and mounting for a thermostat arrangement for improving the accuracy of the control obtainable from the thermostat.

One of the objects of our invention is to provide a construction of flexible mounting for a thermostat by which minimum electrical losses through capacity will be sustained for increasing the precision of operation of the thermostat for correspondingly controlling temperature conditions to which frequency control apparatus is subjected.

Another object of our invention is to provide a construction of thermostat mounting and electrical circuit arrangement for the thermostat in which minimum inaccuracies due to passage of radio frequency currents through the thermostat are introduced in instances where the temperature control circuit is employed in proximity to a high frequency oscillator circuit.

Still another object of our invention is to provide a construction of mounting for a thermostat of a temperature control apparatus in which the capacity path to ground through the thermostat is maintained at a very small value for substantially reducing the leakage path to ground for high frequency currents from high frequency circuits used in proximity to the temperature control apparatus for insuring precision operation of the thermostat.

Other and further objects of our invention reside in the construction of flexible mounting and circuit arrangement for a thermostat as set forth more fully in the specification hereinafter following by reference to the accompanying drawing, in which:

Figure 1 schematically illustrates the arrangement of temperature control apparatus constructed in accordance with our invention and electrically connected for providing a minimum capacity path to ground; Fig. 2 is an elevational view showing the thermostat mounting of our invention; Fig. 3 is a side view of the thermostat mounting with parts broken away and illustrated in cross-section; Fig. 4 is a lateral cross-sectional view taken on line 4—4 of Fig. 3; Fig. 5 is a lateral cross-sectional view taken on line 5—5 of Fig. 3; Fig. 6 is a lateral cross-sectional view on line 6—6 of Fig. 3; and Fig. 7 is a perspective view of one form of flexible mounting which we provide for the temperature control thermostat used in the temperature regulation system of our invention.

In a thermal control unit for electromechanically controlled high frequency oscillators it is essential for the accurate control of temperature that the entire surface of the sensitive part of the mercury thermostat used be exposed to the surrounding air. It must have some supports, however, but these should be of minimum amount of material. It is desirable to have the mounting of the thermostat shock-proof so as to protect the thermostat against injury and change of calibration due to vibration or shock. Since such a thermostat is a delicate device, it can be easily injured. It is also desirable to arrange the mounting so that the thermostat can be easily and quickly replaced. These qualities are afforded by the arrangement of the device of our invention.

When the thermostat device is used in a radio transmitter considerable radio frequency energy is liable to be picked up by the lines to the relay from the thermostat. If radio frequency choke coils and bypass condensers are used, considerable of this energy is kept away from the thermostat. However there is considerable electrostatic capacity between the mercury inside the thermostat and the mounting device with the glass wall as a dielectric. If this mounting device is grounded and radio frequency energy is present between the mercury of the thermostat and ground, radio frequency current will pass through this capacity. The radio frequency losses in the glass may cause heat and a resultant temperature rise of the mercury and thus cause inaccuracies in temperature control. The possibility of this difficulty is reduced to a minimum in our invention by insulating the thermostat support. The electrostatic capacity of the mounting device with respect to the ground is thus maintained very small. Thus the possible current through this path is reduced to a minimum.

Referring to the drawing in detail, reference character 1 designates the thermostat constituted by a glass tube having a bulb 2 which contains a quantity of mercury and forms the sensitive part of the instrument. Near the top of this bulb the capillary tube 3 is connected and contains contact members 4 and 5 constituted by wire members inserted into the wall of capillary tube so as to connect with the mercury in bulb 2 when the mercury is caused to rise in the capillary tube by the increase in temperature. These wires are connected to bands surrounding the tube 3 and located immediately above the wires. The bands form substantial electrical contacts for engaging with clips 6 and 7. The clips 6 and 7 are supported from member 8 by means of screws 9 and 10 which also serve as binding posts for connections to the external circuit. Strip member 8 is made of material having good electrical and heat insulating qualities. The insulation strip member 8 is mounted adjacent the metallic panel 11 by means of screws 12 and 13 or in any other desirable way. A plan view of the mounting is shown in Fig. 5. The construction of clip 7 is seen in this view and consists of flat spring members 14 and 15 which are bent in the form shown to provide flexibility in a plane perpendicular to the thermostat and to provide a means of quickly engaging and holding the thermostat. Springs 14 and 15 are made wide enough to engage with contact 5 at all times so as to permit the thermostat to move up and down. This arrangement protects the thermostat against vibration with continuous electrical contact. The lower end of the thermostat is supported by a wire spring member 16 wound at one end in the form of a spiral 17. The other end of 16 is supported by a screw 19 which is screwed a short distance into insulated member 8. The extreme end of 16 is bent as shown at 19a and enters the insulation strip 8 to prevent turning. The spiral 17 is wound to conform to the shape of the bottom of the bulb of the thermostat 2. Its height is sufficient to prevent the thermostat from being thrown out of position by vibration. The turns of the spiral are spaced sufficiently to permit good circulation of air about the bottom of the thermostat. This arrangement provides a minimum amount of material in contact with the sensitive part of the thermostat which results in greater accuracy of temperature control.

The spiral wire 17 is constructed in such manner that minimum mechanical contact is provided with the end of bulb 2. This is accomplished by shaping wire 17 with a plurality of inwardly directed projections 18 which are aligned one above the other in the spaced turns of the wire-like basket and provide substantially point contact with the wall of the bulb 2. That is to say, lines drawn tangent to the bulb 2 will also be tangent to the inwardly directed portions 18 of the wire-like member 17. The substantially point contact thus provided between the several turns of the wire-like basket and the bulb 2 allows free access of the air about the bulb and thus permits maximum accuracy of temperature control. The flexibility of the wire-like basket 17 is such that the thermostat is protected against shock so that an abrupt shock is not so liable to injure the thermostat or tend to displace the thermostat from the flexible mounting.

As illustrated more clearly in Fig. 1, the thermostat 1 is shown mounted in relation to panel 11 within the electromechanical vibrator casing represented generally by reference character 39. The electromechanical vibrator casing includes the electromechanical vibrator device illustrated generally at 20 which may be selectively connected in the control circuit of a high frequency oscillator by means controlled through the movement of switch arm 21. Leads 22 serve to convey the high frequency oscillations to the control tube circuit or to the power amplification system. By virtue of the close association of the thermostat and temperature control circuit with the high frequency oscillator circuit we take particular care to isolate the temperature control circuit against the effects of the high frequency currents in the oscillator circuit. This is accomplished by introducing radio frequency choke coils 23 in the temperature regulating circuit and arranging the bypass condensers 24 across the terminals 9—10 of the thermostat and connecting the midpoint 25 thereof to ground at 26 as shown. The relay 27 is disposed in series with the terminals of the thermostat and in series with the section 28 of the potentiometer 29. The armature 30 which is controlled by relay winding 27 is normally closed with respect to the back contact 31 for establishing a circuit through section 32 of potentiometer 29 through the heating coil 33 within the temperature controlled cabinet structure 39. The power line circuit or power supply source connects across terminals 34 across which the sections 28 and 32 of the potentiometer 29 are connected for dividing the potential so that a portion thereof is utilized in the relay control circuit according to the drop across section 28 of the potentiometer while the remainder of the current delivered from source 34 is utilized for energizing the heating coil 33.

It will be observed that the bulb 2 of the thermostat is insulatingly supported in spaced relation to any direct path to ground. Whatever electrostatic capacity necessarily remains may be integrated by the capacity represented at 34 which is the electrostatic capacity between the mercury inside the thermostat and the turns of the coil spring 17 constituting the supporting basket for the thermostat. The electrostatic capacity between the supporting basket 17 and the panel 11 which is carried by frame 36 and connected to ground 35 may be integrated as designated at 37. By reason of the high degree of insulation of basket 17 with respect to panel 11 on insulated strip member 8, the capacity 37 is reduced to a minimum. By reason of this small capacity, the passage of radio frequency current through the path extending from the mercury and the bulb of the thermostat to ground 35 is reduced to an extremely small value. Thus heating of the thermostat due to stray radio frequency currents is substantially eliminated and control of the relay circuit for controlling the energization of the heating coil 33 is thereby rendered highly efficient and in accordance with temperature conditions within the cabinet structure 39 immediately adjacent the electromechanical vibrators 20.

The temperature control system of our invention has been developed particularly for use with piezo electric crystal controlled oscillators but we desire that it be understood that the temperature control system of our invention may be employed for various types of electromechanical vibrators and that various applications and modifications of our invention will suggest themselves to those skilled in the art. Accordingly we desire that it be understood that modifications of our invention may be readily made and that no limitations upon our invention are intended other than are imposed by the scope of the appended claims.

The invention described herein may be manufactured and used by or for the Government of the United States for governmental purposes, without the payment of any royalty thereon.

What we claim as new and desire to secure by Letters Patent of the United States is as follows:

1. In a temperature control system for high frequency precision electrical apparatus, an insulating supporting panel, a mercury thermostat including a tubular portion and a bulb portion, electrical contacts in said tubular portion, means for resiliently suspending said thermostat in a vertical position comprising a pair of metallic clip members extending angularly from said insulating supporting panel in a horizontal plane and slidably engaging the tubular portion of said thermostat and establishing electrical connection with said electrical contacts, and a basket-like support formed of a spirally wound wire member having one end thereof extending parallel to said metallic clip members and fixed to said insulating panel, the turns of said wire member having inwardly protruding segmental projections engaging the bulb portion of said thermostat.

2. In a temperature control system for high frequency precision electrical apparatus, an insulated support, a mercury thermostat including a tubular portion and a bulb portion, electrical contacts in said tubular portion, metallic members extending from said support and slidably engaging said tubular portion and establishing electrical connection with said contacts, a spiral wire-like device having a plurality of indentations thereon for establishing substantially point contact with the lower end of the bulb of said thermostat and allowing free circulation of air therearound with minimum electrical capacity with respect to the mercury in said bulb, and means extending from said support for resiliently suspending said wire-like device.

3. In a temperature control system for high frequency precision electrical apparatus, an insulated support, a mercury thermostat including a tubular portion and a bulb portion, electrical contacts in said tubular portion, metallic members extending from said support and slidably engaging said tubular portion and establishing electrical connection with said contacts, a wire-like device having a plurality of spirally disposed turns constituting a basket for supporting the lower end of the bulb of said thermostat, the turns of said wire-like device having inwardly protruding segmental projections aligned one above another for establishing tangential contact with the bulb of said thermostat for allowing free circulation of air therearound with minimum electrical capacity with respect to the mercury in said bulb, and an extension on said wire-like device connected with said support.

LOUIS A. GEBHARD.
LOUIS A. VAN LOOCK.